United States Patent [19]

Kurosawa et al.

[11] Patent Number: 5,585,915
[45] Date of Patent: Dec. 17, 1996

[54] LIGHT DETECTING DEVICE

[75] Inventors: Kiyoshi Kurosawa; Wataru Watanabe, both of Tokyo; Akira Tanaka; Yuji Kojima, both of Kawasaki; Kiyoshi Fujii; Mamoru Yamada, both of Ichihara, all of Japan

[73] Assignees: Fujitsu Ltd.; Fuju Electric Co., Ltd., both of Kawasaki; The Tokyo Electric Power Co., Inc., Tokyo, all of Japan

[21] Appl. No.: 327,821

[22] Filed: Oct. 17, 1994

Related U.S. Application Data

[63] Continuation of Ser. No. 939,513, Sep. 3, 1992, abandoned.

[30] Foreign Application Priority Data

Sep. 4, 1991 [JP] Japan .................................. 3-224242

[51] Int. Cl.⁶ .................................................... G02B 5/14
[52] U.S. Cl. ........................................ 356/218; 250/227.31
[58] Field of Search ..................................... 356/213, 218; 250/227.31, 458.1

[56] References Cited

U.S. PATENT DOCUMENTS

| | | | |
|---|---|---|---|
| 3,934,148 | 1/1976 | Collins | 250/458 |
| 4,149,902 | 4/1979 | Mauer et al. | 136/89 PC |
| 4,227,939 | 10/1980 | Zewail et al. | 136/247 |
| 4,371,897 | 2/1983 | Kramer | 250/458.1 |
| 4,425,907 | 1/1984 | Younghouse | 126/439 |
| 4,467,208 | 8/1984 | Muller et al. | 250/483.1 |
| 4,753,512 | 6/1988 | Aurouet et al. | 250/458.1 |
| 4,812,013 | 3/1989 | Aurouet et al. | 350/96.29 |
| 5,132,530 | 7/1992 | Groh et al. | 250/227.31 |

FOREIGN PATENT DOCUMENTS

| | | |
|---|---|---|
| 2-181668 | 7/1990 | Japan . |
| 3-77026 | 4/1991 | Japan . |
| 3-188303 | 8/1991 | Japan . |
| 3-211403 | 9/1991 | Japan . |

OTHER PUBLICATIONS

Harris et al., "Spark discharge detection using photoluminescent optical fibre—application in microwave waveguides," *SPIE Fibre Optics '89*, vol. 1120, Sep. 1989, pp. 338–341.

Mangeret et al., "Optical detection of partial discharges using fluroescent fibre," *IEEE Trans. Elec. Insul.*, vol. 26, No. 4, Aug. 1991, pp. 783–789. (Orally disclosed on Sep. 10, 1990 at the 10th International Conference on Conduction and Breakdown in Dielectric Liquid (ICDL).).

Kurosawa et al., "A New Scheme Of Fiber Optic Light Sensor For Detection Of Corona Discharges In Gas Insulated Power Apparatus," *IEEE Conference Proceedings*, 8th Optical Fiber Sensors Conference, Jan. 29–31, 1992, Monterey, CA, pp. 422–425.

*Primary Examiner*—Richard A. Rosenberger
*Attorney, Agent, or Firm*—Staas & Halsey

[57] ABSTRACT

A light detecting device for reliably detecting weak luminescing at a random position in a predetermined spatial area. The light detecting device has a fluorescent fiber containing a fluorescent coloring matter and a flat or curved concentrator having a primary surface, on which the fluorescent fiber is fixedly arranged with the axis thereof in parallel relationship to the primary surface. A light receiving means is connected to at least one end of the fluorescent fiber.

22 Claims, 14 Drawing Sheets

LIGHT DETECTING DEVICE

This application is a continuation of application Ser. No. 07/939,513, filed Sep. 3, 1992, now abandoned.

BACKGROUND OF THE INVENTION

1. Field of the Invention

The present invention relates to a fluorescent fiber type light detecting device which is suitable for detecting a luminescence condition and a luminescence position for a weak light.

2. Description of the Related Art

In the prior art, a gas insulated switchgear employed, for example, in a substation facility and so forth, has a construction, in which a gas, such as sulfur hexafluoride ($SF_6$) gas is enclosed within a metallic casing and a plurality of switches and interrupters are arranged in the sulfur hexafluoride ($SF_6$) atmosphere.

Such gas insulated switchgear is adapted to perform switching at substantially high current. Therefore, an arc discharge can be generated between the switch and casing due to fatigue of components or the sulfur hexafluoride ($SF_6$) gas. Also, a weak corona discharge resulting from a local high electric field can be caused due to presence of a shape projection or a floating metallic impurity within the casing. If such a corona discharge is left without any treatment, the insulation performance of the equipment is lowered to possibly cause a failure resulting in earth-fault, short-circuit or so forth. In the prior art, in order to monitor such corona discharge, sensors for electrically detecting a voltage, a current, or an acoustic vibration generated in association with the discharge have been used. However, due to the presence of external noise, such as electromagnetic noise, vibration and so forth, an improvement for reliability of the detecting performance of such sensors has been desired.

Hereinafter, discussion will be presented of a conventional method for detecting a luminous condition due to corona discharge and so forth, with reference to FIGS. 18 to 22.

FIG. 8 is a section of a luminescence position detecting device employing a plurality of fluorescent fibers, in which a plurality of optical fiber sensors 1a, 1b and 1c are arranged in parallel. Each of the optical fiber sensors 1a, 1b and 1c is provided with a fluorescent fiber F, in which a fluorescent coloring matter, such as BBOT (2,5-bis[5-tert-2butybenzoxazoyl]thiophene), is doped, at one end of a transparent optical fiber 2, and a light receiving element 3 is provided at the other end.

The fluorescent fibers F of respective optical fiber sensors 1a, 1b, 1c are arranged in mutually offset positions in the longitudinal direction of the optical fiber sensors. The side surfaces of the fluorescent fibers F are directed to opposing positions where luminescing in the $SF_6$ (sulfur hexafluoride) gas is expected.

Since the fluorescent fiber doped with fluorescent coloring matter including BBOT, i.e. the fluorescent fiber doped with BBOT or mixture of BBOT and other fluorescent coloring matter, reacts to luminescing in the $SF_6$ gas, it can be used for detecting the luminescence position.

In addition, the fluorescent fiber F fluoresces even in response to the light inciding from its side surface, so luminescing in a wide area can be detected by arranging the fluorescent fiber to direct the side surface toward the position where luminescing is expected. Namely, by expanding the lengths L of the portions of the fluorescent fibers in the optical fiber sensors 1a, 1b and 1c of FIG. 18, the area for detecting the luminescing can be expanded.

Assuming that a discharge luminescing is caused for some reason in the $SF_6$ gas at a position opposing the side surface of the fluorescent fiber F of the intermediate optical fiber sensor 1b, the generated light incides through the side surface of the fluorescent fiber F. By the incident light, the fluorescent material in the fluorescent fiber F is excited to generate fluorescence 5. The fluorescence propagates through the transparent fiber 2 and is detected by the light receiving element 3. As a result, the fact that the light receiving element of the optical fiber sensor 1b receives the light, can be detected by detecting the output signal of the light receiving element 3. Also, by this, it can be determined that the luminescence position is the position opposing the fluorescent fiber F of the intermediate optical fiber sensor 1b.

As set forth above, by arranging the fluorescent fibers of the optical fiber sensors with an offset in a magnitude corresponding to the length L of the fluorescent fiber, luminescing in the area of the 3L length can be detected with three optical fiber sensors. On the other hand, by setting the length L of each fluorescent fiber shorter and setting the magnitude of offsetting of the fluorescent fibers smaller, higher resolution can be achieved thus enabling detection of the luminescing position with high precision, though the number of required optical fiber sensors is increased.

FIG. 19 shows a section of a luminescence position detecting device employing a single fluorescent fiber. The single optical fiber sensor 7 is arranged to direct the side surface thereof to the position where luminescing in the $SF_6$ gas is expected. This optical fiber sensor is constructed by arranging the light receiving elements 3a and 3b at both ends of the fluorescent fiber F which is formed by doping with a fluorescent coloring matter including BBOT. Both of the light receiving elements 3a and 3b are connected to a comparator circuit 6 so that the luminescence position is detected by comparing the output values of both light receiving elements 3a and 3b.

In this device, if luminescing 4 is caused due to discharge in the $SF_6$ gas, the fluorescent material at the position corresponding to the position of the luminescing 4 fluoresces. Since the incident position of the discharge luminescence 4 on the side surface of the fluorescent fiber is a shorter distance L2 away from the right side light receiving element 3b than that of L1 from the left side light receiving element 3a, a transmission loss to reach the left side light receiving element 3a is greater than that to reach the right side light receiving element 3b. As a result, by comparing the light receiving magnitudes of the light receiving elements 3a and 3b in the comparator 6, the position of the discharge luminescing can be detected.

FIG. 20 is an explanatory illustration for explaining fluorescent converting action in the fluorescent fiber formed by doping BBOT on a polycarbonate. The reference numeral 8 denotes a core of the fluorescent fiber, which is formed by doping BBOT to polycarbonate. The outer periphery of the core 8 is covered with a clad 9. The external diameter of the clad is on an order of 1 mm$\phi$.

Assuming that a refraction index of the core is $n_1$ and a refraction index of the clad 9 is $n_2$, it is established that $n_1 > n_2$. On the other hand, assuming a wavelength of the incident light 10 through the side surface of the fluorescent fiber is $\lambda_1$, and a wavelength of fluorescence 11 propagating with total reflection in the core 8 is $\lambda_2$, a relationship of $\lambda_2 < \lambda_2$ is established.

As the core 8, polycarbonate doped with 0.02 Wt % of BBOT is used. On the other hand, as the clad 9, a mixture of polymethyl methacrylate and polyvinylidene fluoride is used. Considering that the particles of the BBOT fluorescent material doped in the polycarbonate are represented by the reference numeral 12, when the incident light 10 having the wavelength $\lambda_1$ is irradiated from the side surface of the fluorescent fiber on the BBOT fluorescent material particles 12, the BBOT fluorescent material particles 12 fluoresce with the fluorescence having a wavelength $\lambda_2$ which is longer than $\lambda_1$.

The luminescence propagates in all directions. However, when it incides in the clad 9, the component having a greater incident angle than a critical angle $\theta_c$ propagates to the end of the core repeating a full reflection within the core. The component having a smaller incident angle than the critical angle $\theta_c$ escapes to the outside passing through the core 8 and the clad 9.

Accordingly, it becomes necessary for detecting weak luminescing in the $SF_6$ gas so that, when the incident light 10 incides from the side surface of the fluorescent fiber, BBOT fluorescent material particles 12 effectively fluoresce, and the large amount of thus generated fluorescence propagates as full reflected light 11 to exit through the end.

FIG. 21 shows a section illustrating an example implementing the fluorescent fiber type luminescence position detecting device as shown in FIGS. 18 and 19 in a gas insulated switchgear. The gas insulated switchgear employed in a substation facility and so forth has a construction in which the $SF_6$ gas is enclosed within a metallic tank and a plurality of switches 13 . . . are arranged within the $SF_6$ gas atmosphere.

Since each switch 13 . . . performs switching at an extremely high voltage current, an arc discharge 23 can be caused due to fatigue of the components of the device or fatigue of the $SF_6$ gas, and, alternatively, local luminescence 25 can be induced by foreign matter 24 when the foreign matter is present in the $SF_6$ gas atmosphere. When such discharge is caused, it becomes necessary to detect this to effect treatment, such as maintenance.

In FIG. 21, a denotes a luminescence position detecting device employing a plurality of optical fiber sensors as shown in FIG. 18, and b denotes a luminescence position detecting device employing a single optical fiber as shown in FIG. 19.

The luminescence position detecting devices a and b are disposed within the tank 14 which encloses $SF_6$ gas and houses the voltage switches 13 . . . . In the tank 14, the luminescence position detecting device a includes a plurality of optical fiber sensors 1a, 1b . . . which are shown in FIG. 18, within a pipe 15 and houses respective light receiving elements within an output opening 16, from which an output signal line 17 is extended. n optical fibers are employed so that the fluorescent fiber portions thereof are arranged offset at a given pitch L so as not to leave a position where the fluorescent fiber portion is not present, over a detecting area nL.

Therefore, in the area nL, when a discharge is caused, the discharge light incides though the side surface of the fluorescent fiber of the optical fiber sensor and is converted into a fluorescent light. The light receiving element converts the fluorescent light into an electrical signal to be output through the output signal line 17. Then, the luminescence position can be detected depending upon the output signal line, on which the output signal occurs.

Within the tank 14, the luminescence position detecting device b has a single optical fiber sensor 7 as shown in FIG. 19. The light receiving elements at both ends are housed at the output openings 19 and 20, from which output signal lines 21 and 22 are extended. The output signal lines 21 and 22 are connected to the comparator 6. Therefore, by comparing the detection signals of the light receiving elements at both ends of the optical fiber sensor 7, the luminescence position of the discharge light in a detecting area L can be detected.

In order to shorten a period required for recovery when failure is caused in the gas insulated switchgear and thus stably supply electric power, it is required to provide a preliminary diagnosis system for detecting failure. Since the gas insulated switchgear causes a weak local discharge from a faulty portion as a precursor to failure, it has been proposed to employ a light detecting device employing the fluorescent fiber for effectively detecting such weak light.

FIG. 22 is a section taken along line B—B of FIG. 21. The reference numeral 4 denotes a luminescence due to an arc discharge or local luminescence. Such luminescence is not always caused at the side of the optical fiber sensor 7. If luminescing is caused at the opposite side of the optical fiber sensor, it is possible that the optical fiber sensor 7 cannot receive the light due to the light being blocked by the high voltage switches 13 . . . .

On the other hand, since the optical fiber sensor 7 is formed in the form of a thin line to provide a small light receiving area, only a small amount of light can be caught by the fluorescent fiber of the optical fiber even when the luminescing is caused at the side of the optical fiber sensor. Therefore, detection of the light cannot be satisfactorily reliable. Furthermore, the light intensity inciding in the optical fiber sensor is inversely proportional to the square of the distance between the luminescence position and the optical fiber sensor 7, so it is possible that the luminescence cannot be detected accurately when the luminescence is caused at a position far away from the optical fiber sensor.

SUMMARY OF THE INVENTION

It is an object of the present invention to overcome the drawbacks of the prior art and to provide a light detecting device which can reliably detect luminescing, particularly weak luminescing at random positions in a predetermined spatial area with simple construction and can improve performance and reliability thereof.

In order to accomplish the above-mentioned object, a light detecting device, according to the present invention, basically has the following construction.

A light detecting device according to one embodiment of the invention, comprises a fluorescent fiber containing a fluorescent coloring matter, a flat or curved concentrator having a primary surface, on which the fluorescent fiber is fixedly arranged with the axis thereof in a parallel relationship to the primary surface, and a light receiving means connected to at least one end of the fluorescent fiber. According to another embodiment of the invention, a light detecting device comprises a fluorescent fiber containing a fluorescent coloring matter, a flat or curved concentrator containing a fluorescent coloring matter having a side surface portion, to which the fluorescent fiber is arranged in opposition, and a light receiving means connected to at least one end of the fluorescent fiber.

DESCRIPTION OF THE PREFERRED EMBODIMENT

Practical embodiments of a light detecting device according to the present invention will be discussed herebelow in detail with reference to the accompanying drawings.

Figure 1:
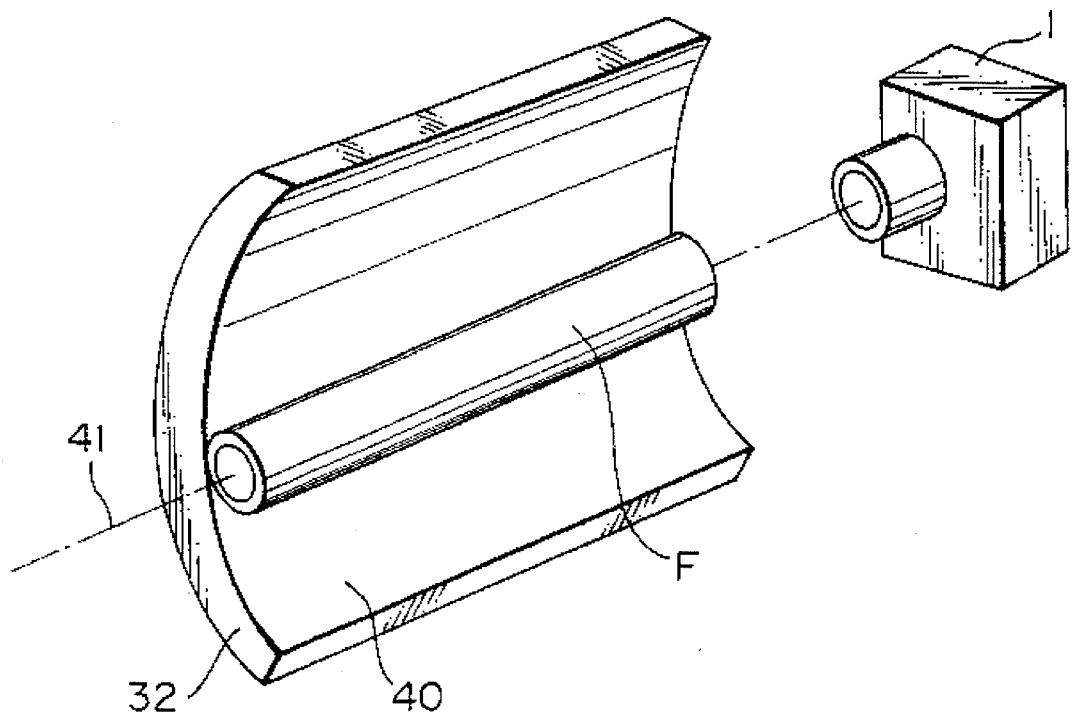
FIG. 1 is an explanatory illustration showing one practical embodiment of an arrangement of a concentrator and a fluorescent fiber in a first embodiment of a light detecting device according to the present invention.

FIG. 1 shows one example of a first embodiment of a light detecting device according to the present invention. The light detecting device includes a fluorescent fiber F containing a fluorescent coloring matter 12 and a plate form or curved concentrator 32. The fluorescent fiber F is fixedly arranged on a primary surface 40 of the concentrator 32 so that the main axis 41 of the fluorescent fiber F extends in parallel to the primary surface 40 of the concentrator. The fluorescent fiber has at least one end, to which a light receiving means 1 is connected.

Namely, in the first embodiment of the light detecting device of the invention, in comparison with the conventional light detecting device which is difficult to reliably and accurately detect a luminescing of a weak corona discharge or so forth for simply arranging a single fluorescent fiber in a gas enclosing container of a gas insulated switchgear, for example, the device can achieve substantial or significant improvement in detecting resolution of the luminescing since the concentrator 32 is employed in combination with the fluorescent fiber F so that the light generated by luminescing due to a weak corona discharge can be concentrated at the fluorescent fiber F as much as possible.

For this purpose, the concentrator 32 in the present invention is required to reflect the received light and to direct the reflected light toward the fluorescent fiber F. Accordingly, in the shown practical embodiment, the primary surface 40 of the concentrator 32 is preferably formed of a material having a high light reflection coefficient. For example, it may be plated or coated with a metallic film or provided with a mirror finish.

Figure 2:
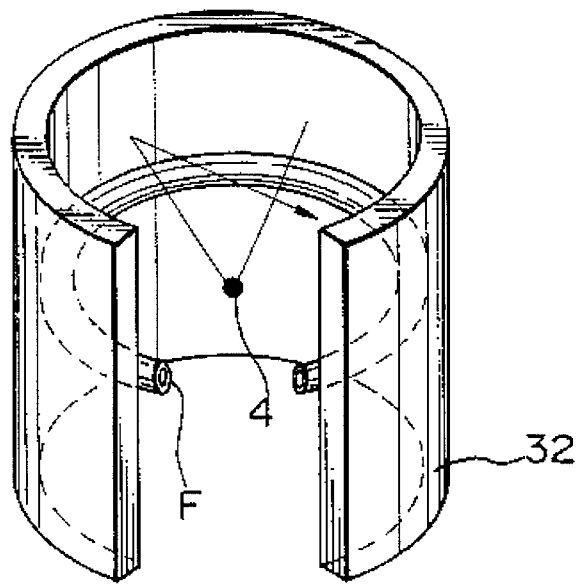
FIG. 2 is an explanatory illustration showing one practical embodiment of an arrangement of a luminous source, the concentrator and the fluorescent fiber in the embodiment of FIG. 1.

The configuration of the concentrator 32 according to the present invention can be a plain plate form, but preferably is in a concave configuration with a predetermined curvature as illustrated in FIG. 1. More practically, the concentrator 32 may be formed into a cylindrical configuration as shown in FIG. 2, with the fluorescent fiber F arranged on the inner periphery thereof. In the present invention, since the construction as set forth above is employed, the light luminesced at a random position incides as reflected light from the primary surface 40 of the concentrator 32 in addition to the light directly inciding to the fluorescent fiber F, so the performance of detection of the luminescing can be increased correspondingly.

Figure 3:
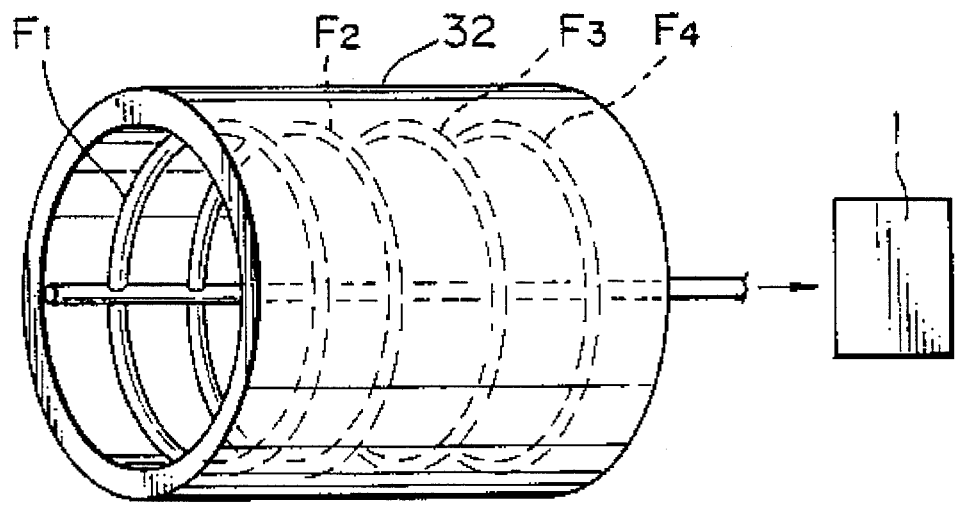
FIG. 3 is an illustration showing another construction of the first embodiment of the light detecting device of the invention.

On the other hand, in the shown embodiment, it is also possible to arrange one of a plurality of fluorescent fibers F along one direction of the primary surface 40 of the concentrator 32. It is further possible to arrange a plurality of fluorescent fibers F in a mutually parallel relationship and in one direction of the primary surface 40 of the concentrator 32 as shown in FIG. 3.

Figure 4:
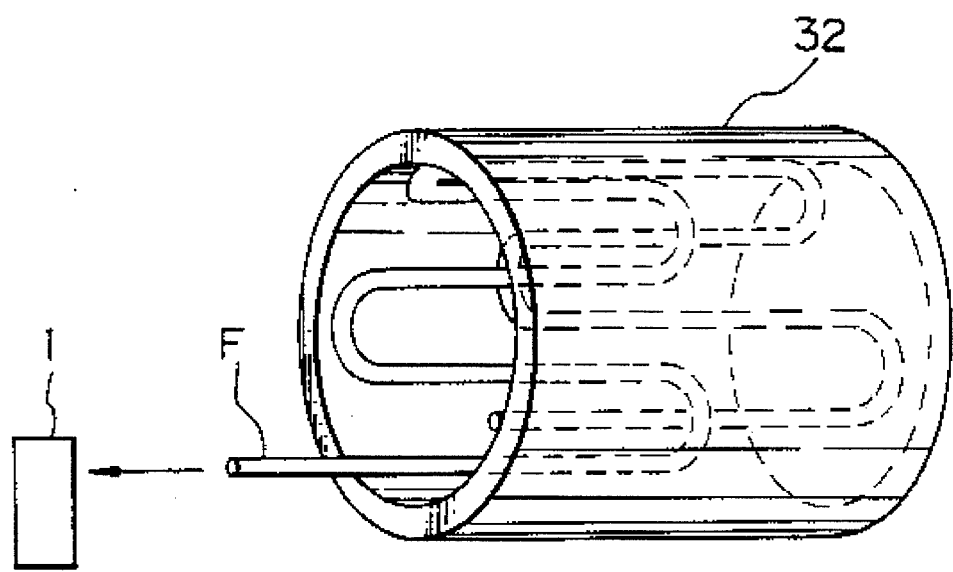
FIG. 4 is an illustration showing a further construction of the first embodiment of the light detecting device of the invention.

Furthermore, in the shown embodiment, it is possible to provide a single fluorescent fiber F bent in a meandering fashion along the primary surface 40 of the concentrator as shown in FIG. 4.

The fluorescent coloring matter contained in the fluorescent fiber F is required to have a property for absorbing a light component having a specific wavelength contained in the light generated from a random light source and for generating a light having a different wavelength from the wavelength of the absorbed light component. For example, perylene and BBOT are both useful for this purpose.

Next, a discussion will be presented for one embodiment of the second embodiment of a light detecting device according to the present invention.

Figure 5:
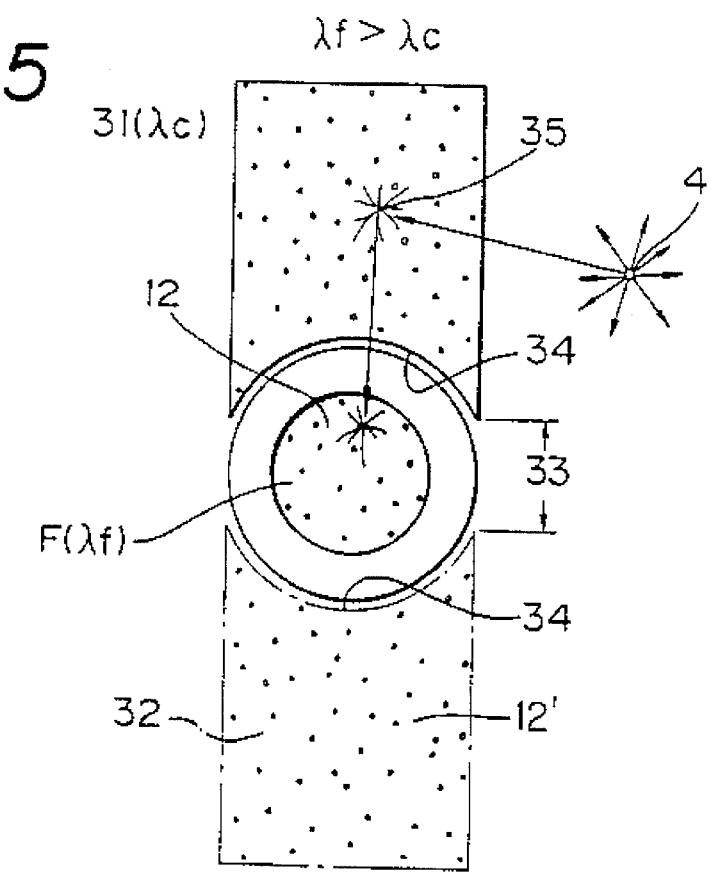
FIG. 5 is a section for illustrating the basic construction of a second embodiment of a light detecting device of the invention.
Figure 6:
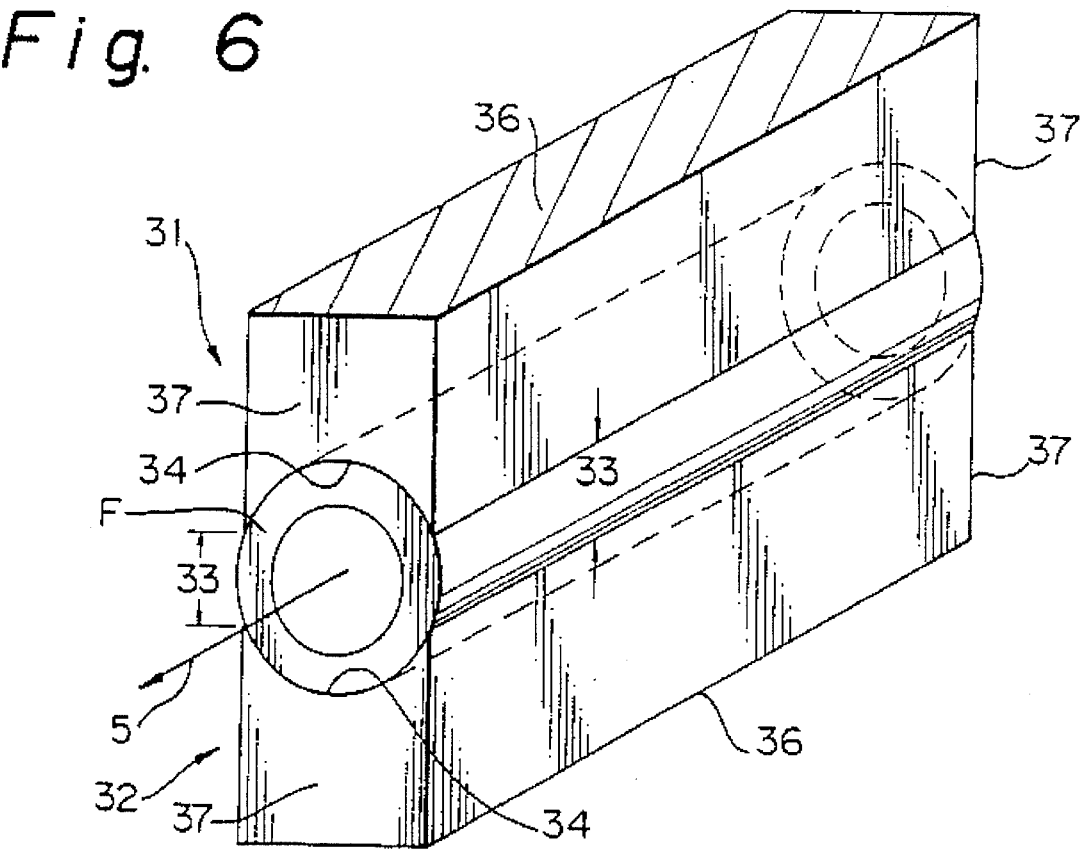
FIG. 6 is a perspective view showing an embodiment employing a rectangular concentrator.

In FIGS. 5 and 6, a second embodiment of the light detecting device according to the present invention is illustrated. The shown light detecting device includes the fluorescent fiber F containing a fluorescent coloring matter 12 as a fluorescent material and the plate form or curved form concentrator 32 containing a fluorescent coloring matter 12. The fluorescent fiber F is arranged at the side of the side surface of the concentrator 32. The fluorescent fiber F is connected to a light receiving means 1 at least at one end thereof.

In addition, the fluorescent fiber F according to the second embodiment of the invention, is preferably arranged between two concentrators 31 and 32 so that the outer periphery thereof opposes the side surfaces 34 of the concentrators 31 and 32. It is further preferred that the fluorescent coloring matter 12 contained in the fluorescent fiber F has a different light absorbtion wavelength and light generating wavelength than the light component from the fluorescent coloring matter 12' contained in the concentrators 31 and 32. More concretely, the fluorescence wavelength upon fluorescing by absorbing the light in the fluorescent coloring matter of the fluorescent fiber F, is desirably set to be longer than the fluorescence wavelength of the fluorescent coloring matter contained in the concentrators 31 and 32.

Figure 7:
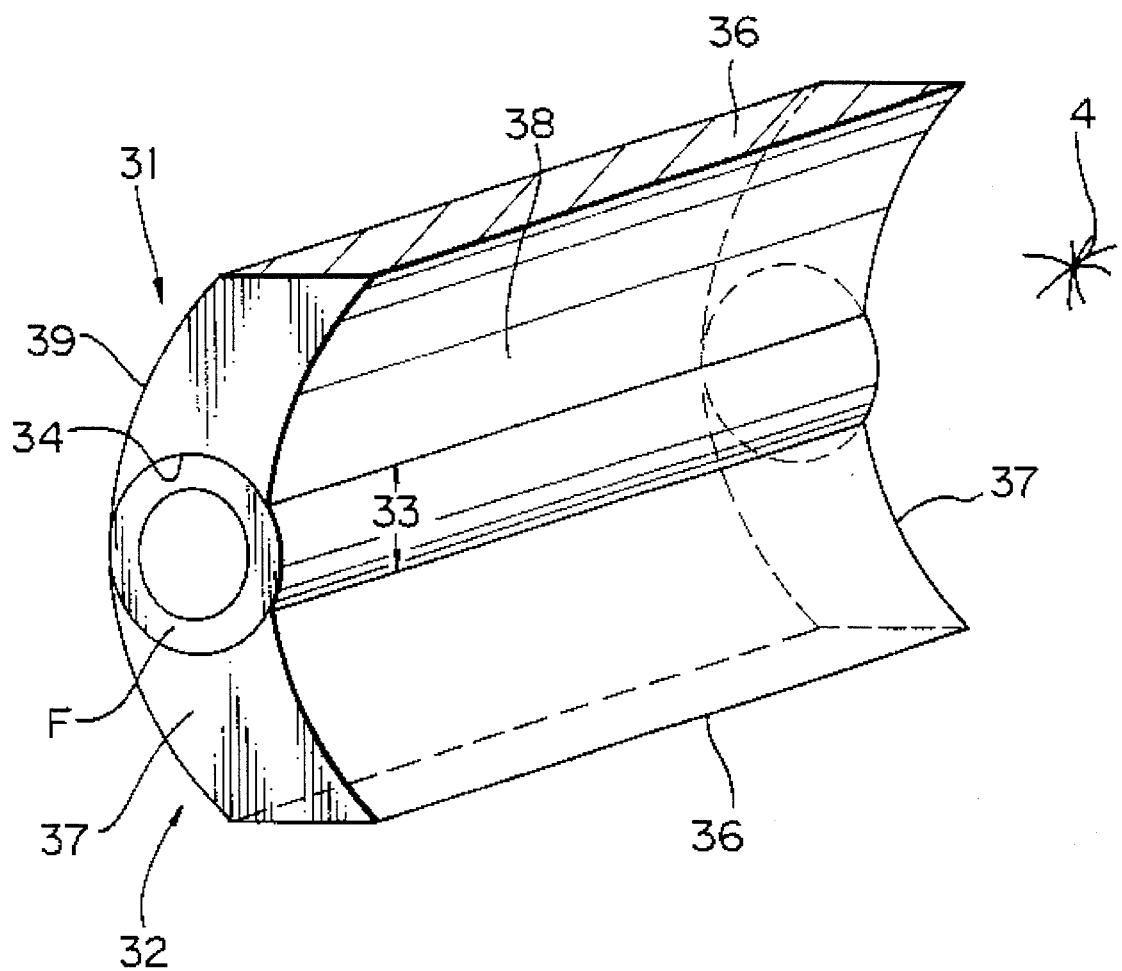
FIG. 7 is a perspective view showing an embodiment employing an arch-shaped concentrator.
Figure 8:
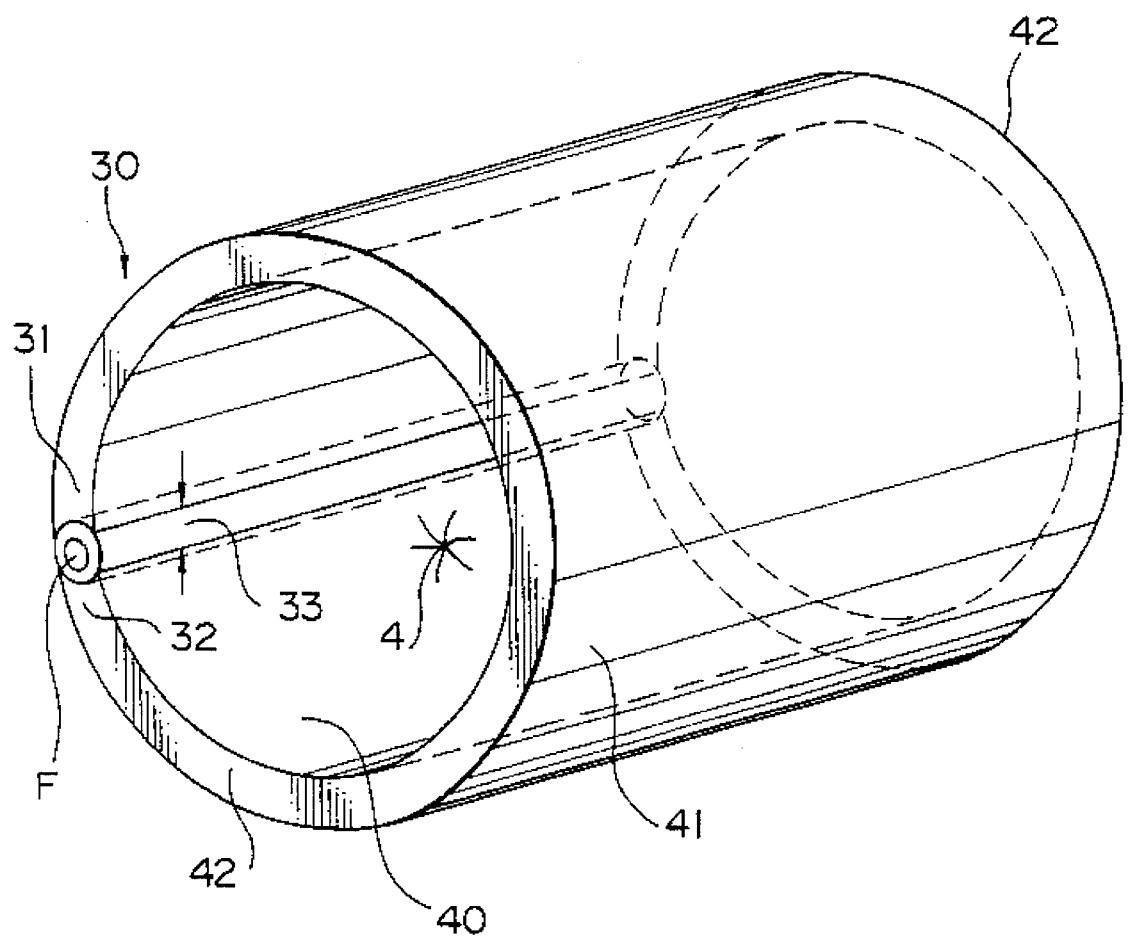
FIG. 8 is a perspective view showing an embodiment employing a cylindrical concentrator.

In addition, it is preferred that the concentrators 31 and 32 are formed into an arch shaped (FIG. 7) or a cylindrical configuration (FIG. 8). More specifically, the concentrator 32 is formed into a single cylindrical configuration having end edge surfaces 34 extending in parallel to the longitudinal axis so as to define a fluorescent fiber receptacle portion 42 therebetween for arranging the fluorescent fiber F therein as shown in FIG. 8.

The second embodiment of the light detecting device according to the present invention, as set forth above, has the concentrators 31 and 32 arranged in opposition to the side surface of the fluorescent fiber F. When the luminescence 4 directly incides in the fluorescent fiber F, the fluorescence is generated by the fluorescent coloring matter 12 in the fluorescent fiber F. The fluorescence thus induced propagates through the fluorescent fiber F to exit from the end surface. This exiting light is received by the light receiving element and converted into the electrical signal for detection of the luminescence position.

In case of the present invention, since the concentrator 31 is present in opposition to the side surface of the fluorescent fiber F, the light may also incide in the concentrators 31 and 32. When the light 4 incides in the plastic concentrator 31 containing the fluorescent coloring matter, the fluorescent coloring matter 35 in the concentrator 31 generates fluorescence as shown in FIG. 5. However, since the fluorescence generated by the coloring matter 35 of the concentrator 31 has a shorter fluorescent wavelength $\lambda_c$ than that $\lambda_f$ of the fluorescence generated in the fluorescent fiber F, the fluorescence generated in the concentrator 31 incides in the fluorescent fiber F through the end surface 34 to excite the fluorescent coloring matter 12 in the fluorescent fiber F for further fluorescence. The fluorescence then propagates through the fluorescent fiber F and is detected by the light receiving element. For instance, when the fluorescence color of the concentrator is green, the fluorescence color of the fluorescent fiber becomes orange or red, those colors having a longer wavelength.

As set forth above, since the light inciding in the concentrators 31 and 32 can be caught for detection, the low focusing ability of the fluorescent fiber due to the small surface area thereof can be compensated by appropriately selecting the size and configuration of the concentrator 31, and thus enables light detection with high precision. Namely, since the light capture area of the concentrator 31 or 32 is large, it becomes possible to catch the luminescence which does not directly incide into the fluorescent fiber F, to incide in the fluorescent fiber F. Therefore, an influence of the positional relationship between the luminescence position and the position of the fluorescent fiber F can be eliminated. Also, even when the luminescing amount is small or luminescing is caused at a position far from the fluorescent fiber F, the light can be certainly caught over a wide area of the concentrator 31 or 32 to enable certain light detection.

In the present invention, it is possible to have one concentrator 31 at one side of the fluorescent fiber F. However, it is preferred to arrange a pair of concentrators 31 and 32 at both sides of the fluorescent fiber F. In that case., the fluorescence induced by light caught by both of the concentrators 31 and 32 incides in the fluorescent fiber F. By employing two concentrators 31 and 32, the light capture area can be remarkably increased to significantly increase reliability of light detection.

The concentrators 31 and 32 according to the present invention may vary in configuration. It may be possible to form the concentrators 31 and 32 in an arch-shaped configuration as illustrated in FIG. 7. This configuration is effective for arrangement within a cylindrical housing. On the other hand, by directing the concave surface 38 of the arch-shaped configuration to the luminescence position, capture of the luminescence becomes certain.

Since FIG. 8 employs a cylindrical concentrator 30, it can certainly catch luminescence at any position by arranging the concentrator so that luminescing at any position is caused inside or outside of the cylindrical concentrator 30 to generate fluorescence to be transmitted to the fluorescent fiber F. Namely, in this case, no directionality between the luminescence position and the fluorescent fiber F is present. Also, since the light capture area can be significantly increased, extremely high reliability in detection of the light can be achieved.

When the light is received at the concentrator 31 or 32 for conversion into the fluorescence and for further conversion into the fluorescence in the fluorescent fiber F as set forth above, loss may be induced during conversion and/or in transmission of the light and/or the fluorescence. As a measure against this, in the embodiment illustrated in FIGS. 5 to 8 of the present invention, on at least one side of the outer periphery of the fluorescent fiber F is provided an area 33 which does not oppose the concentrators 31 and 32. When the light directly incides into the fluorescent fiber F through the area 33, conversion loss will never be caused thus providing higher output signal.

Figure 9:
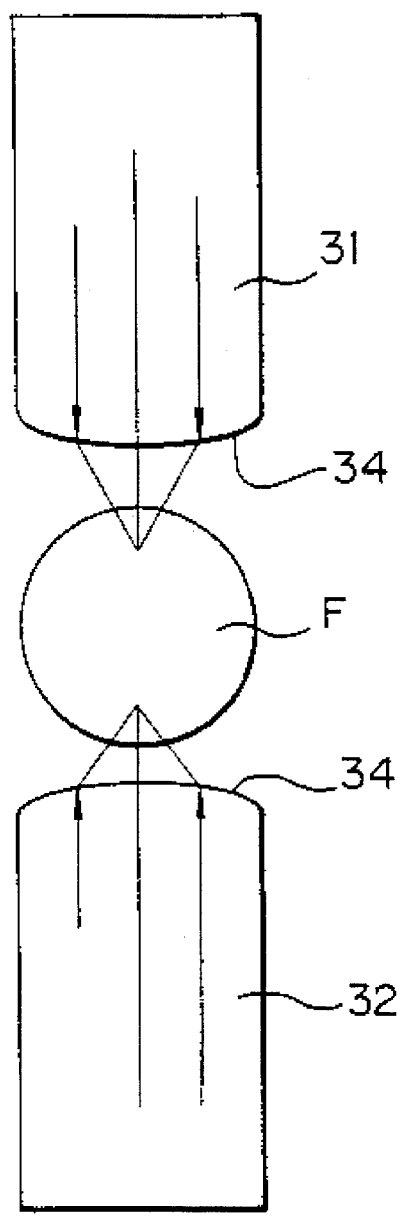
FIG. 9 is an end view of an embodiment, in which a surface of the concentrator opposing the fluorescent fiber is formed into a convex-lens configuration.

In another embodiment of the present invention, as illustrated in FIG. 9, the end surfaces 34 of the concentrators 31 and 32 opposing the fluorescent fiber F are formed as a convex lens. These concentrators 31 and 32 can converge the fluorescence generated therein into the fluorescent fiber F by the lens effect of the convex lens to improve light detection efficiency.

The concentrators 30, 31 and 32 of the present invention are formed of a plastic material. For example, by using a transparent plastic, such as acryl resin, polycarbonate resin, polystyrene resin or co-polymer resins thereof or so forth, high fluorescence permeability and focusing ability can be achieved.

Also, in the present invention, as the fluorescent coloring matter to be contained in the plastic concentrator, organic coloring matters having a high fluorescence conversion rate, such as perylene coloring matter, BBOT, coumarin coloring matter, imidazole coloring matter, b-PBD coloring material or mixed coloring matter thereof, can be used.

Figure 10A:
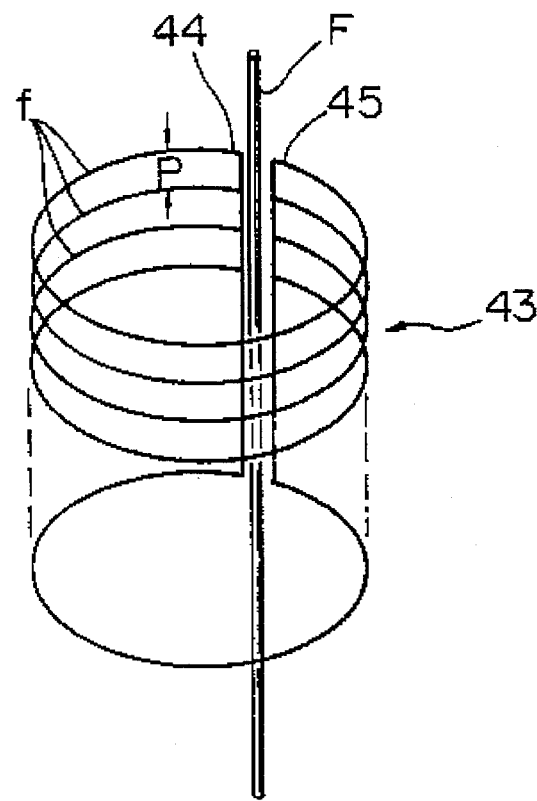
FIGS. 10(a) and 10(b) are a perspective view and plan view, respectively, illustrating the concentrator formed of a plurality of fluorescent fibers arranged in a reed screen line form.
Figure 10B:
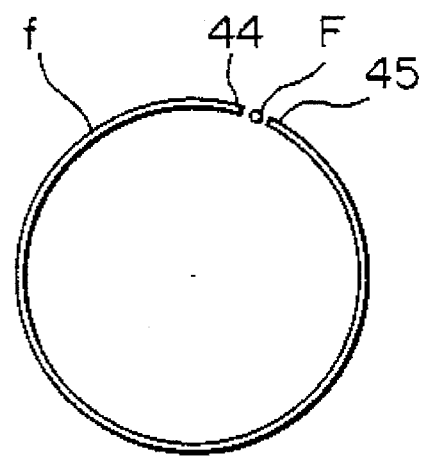

FIGS. 10A and 10B show another practical embodiment of the present invention, in which a concentrator 43 is formed by bending a plurality of the fluorescent fibers f . . . arranged in a reed screen like arrangement, into a ring shaped configuration. With this construction, substantially the equivalent effect to the foregoing cylindrical concentrators 31 and 32 can be achieved. In addition, this embodiment provides an advantage that the concentrator 43 can be formed with fluorescent fibers. In this case, the fluorescence wavelength $\lambda_f$ of the fluorescent fiber for detecting the luminescence position has to be longer than the fluorescence wavelength $\lambda_c$ of the fluorescent fibers of the concentrator.

Figure 11:
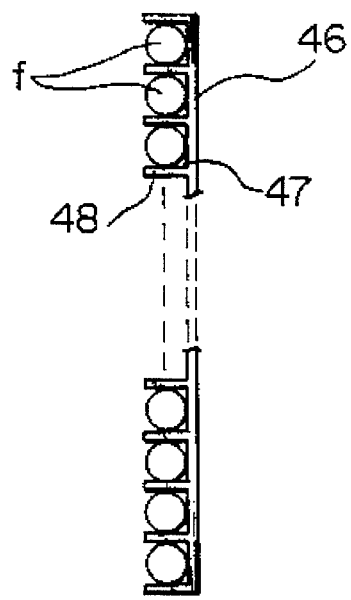
FIG. 11 is a section showing an example of a construction of a focusing fluorescent fiber array formed with a grooved transparent plate.

Since the embodiment illustrated in FIG. 11 has transparent bodies 48 between respective fluorescent fibers f, formation of the concentrator 43 with the fluorescent fibers f becomes easier. In addition, the light inciding in the transparent bodies 48 can incide in the fluorescent fibers f of the concentrator.

Furthermore, in the present invention, it is possible to employ plastic fibers containing a plurality of mutually different fluorescent coloring matters in place of a plurality of fluorescent fibers having the same fluorescent coloring matter, to form a light detecting device employing the concentrator.

Figure 12:
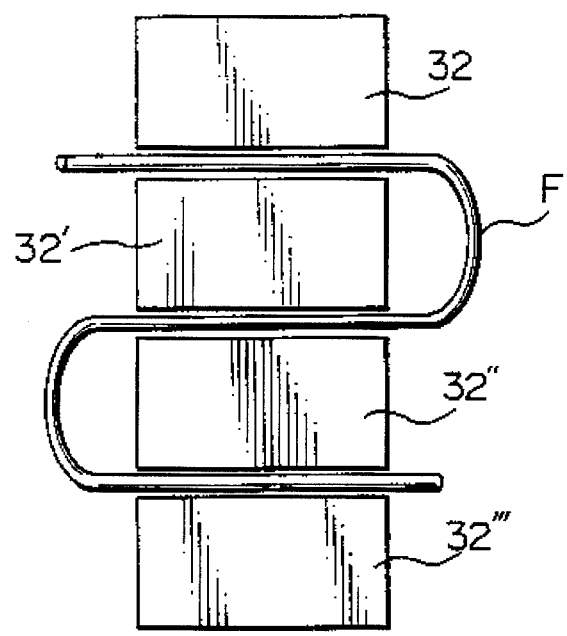
FIG. 12 is an explanatory illustration showing another construction of the second embodiment of the light detecting device according to the invention.

Also, in the present invention, as shown in FIG. 12, it is possible to arrange a plurality of concentrators 32–32''' in an appropriate pattern and to arrange the fluorescent fiber F through the clearances between the concentrators by bending it into a zigzag configuration.

The preferred embodiments of the fluorescent coloring matter 12 and the concentrator 32 to be employed in the present invention will be discussed hereinbelow.

One practical example of an application of a light detecting device according to the present invention, is as applied to a gas insulated switchgear, as set forth above. In a gas insulated switchgear, a corona discharge light generated by a discharge in the sulfur hexafluoride ($SF_6$) gas is a bluish visible light having a primary wavelength component in a range of 320 to 500 nm. When such a wide spectrum is detected by means of the optical fiber, it becomes necessary to convert the wavelength of the discharge light to the lowest wavelength of an absorption band of the optical fiber (typically, a relatively long wavelength band on an order of 650 nm) to propagate to the light receiving means. For this purpose, the coloring matter which has an absorption spectrum in the wavelength band of the corona discharge light and can generate a light having a longer wavelength than the absorption spectrum wavelength and corresponding the lowest wavelength in the light absorption band of the optical fiber, is selected for use. For example, using a plastic fiber doped with a coloring matter in the perylene group, the wavelength of the corona discharge light can be converted into a green fluorescence of a longer wavelength to enable detection.

The concentrator 32 is formed with acryl resin doped with a green perylene coloring matter which absorbs light having a wavelength less than or equal to 520 nm and generates a fluorescence having longer wavelength (e.g. 520~570 nm) so that the corona discharge light is temporarily converted into a light having an intermediate wavelength. Then, using the fluorescent fiber F as the optical fiber using polycarbonate doped with a red perylene coloring matter which absorbs light having a wavelength shorter than or equal to 620 nm and fluoresces a light of a longer wavelength (e.g. 630~680 nm), the light having the wavelength in a range of 520~570 nm, for example and generated by the concentrator 32, is converted into a light having a wavelength in a relatively long wavelength range, i.e., approximately 650 nm, at which the light propagation efficiency in the optical fiber becomes maximum. Furthermore, in the present invention, it is possible to dope the fluorescent fiber F not only with the red perylene coloring matter but also with a green perylene coloring matter which is doped in the concentrator 32.

Practical construction of a light detecting device according to the present invention will be discussed hereinbelow.

The concentrator is formed by preparing a plurality of plate form bodies 1.5 mm thick, 100 mm in length and 54 mm in width with a co-polymer of PMMA resin and styrene resin doped with 0.06 Wt % of a coloring matter consisting of the above-mentioned green perylene coloring matter, and arranging these plates to form two dimensional bodies.

On the other hand, the fluorescent fiber F is prepared by forming the core portion with polycarbonate resin doped with 0.02 Wt % of a coloring matter consisting of green perylene coloring matter and 0.04 Wt % of the coloring matter consisting of red perylene coloring matter. The fluorescent fiber F is then arranged between the concentrators to form the light detecting device.

Next, an effect obtained by using the concentrator which is employed in the present invention will be discussed.

Figure 13:
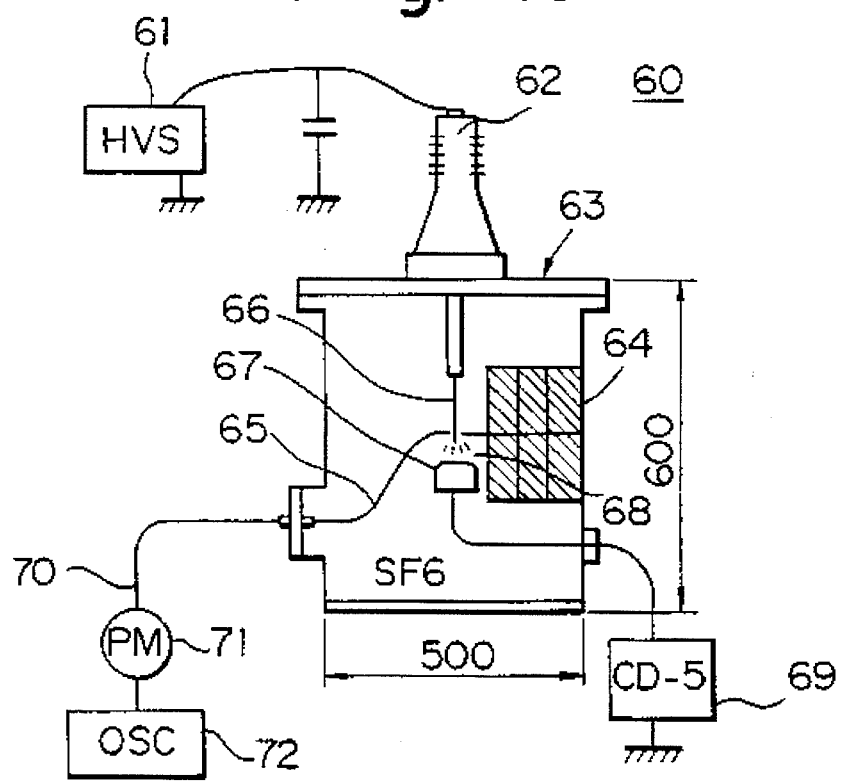
FIG. 13 is an illustration showing one example of a device for inspecting a light detecting performance of the light detecting device according to the present invention.

FIG. 13 shows an example of a measuring device 60 used for experiments in detection of discharge luminescence employing a concentrator 32, in the light detecting device according to the invention. A container 63 is initially reduced in pressure from atmospheric pressure down to 70 Pa. Subsequently, sulfur hexafluoride ($SF_6$) gas is supplied at a pressure of 0.12 Mpa. An electrode portion is formed therein with a copper needle 66 having a spherical tip end, and an aluminum plane plate 67. High voltage is supplied from a high voltage power source 61 to the electrode portion though an insulator 62.

It should be noted that up to AC 30 kV can be applied to the electrode portion from the high voltage power source 61. The discharge is measured by means of a partial discharger 69 at every occurrence of a discharge. On the inner periphery of the container, a plurality of concentrators 64 are arranged regularly. In clearances defined between side faces of the concentrators 64, a fluorescent fiber 65 formed as illustrated in FIGS. 5 to 7, is disposed in a fashion sandwiched between the concentrators 64. To the tip end of the fluorescent fiber 65, a normal optical fiber, such as a PMMA type optical fiber, having the same diameter 70, is connected so as to connect the fluorescent fiber to an appropriate oscillator 72 or a photo counting measurement device via a photomultiplier tube 71 to monitor the discharge condition.

Figure 14:
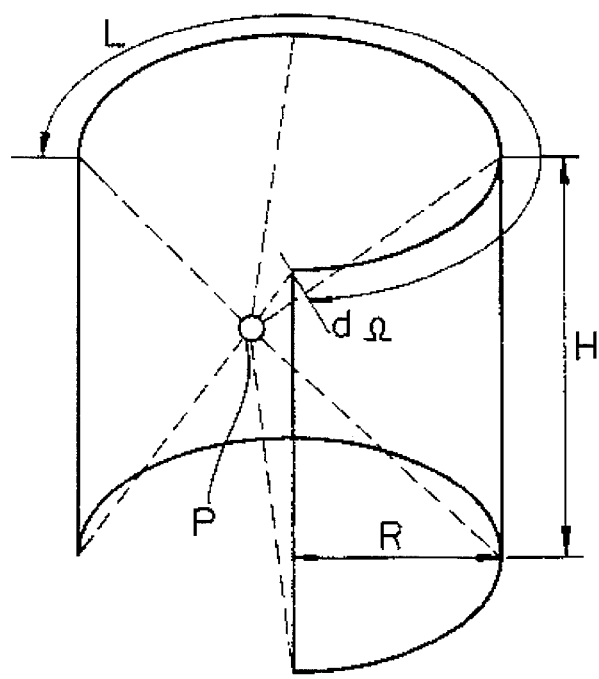
FIG. 14 is an explanatory illustration showing a focusing rate of the concentrator employed in the light detecting device according to the invention.

The light detecting performance of the concentrator 64 is determined by the focusing rate of the concentrator. A discussion will be presented for the incident condition of the discharge light in the concentrator 64 of the light detecting device according to the present invention, with reference to FIG. 14.

Namely, a solid angle of the cylindrical concentrator 64 relative to a discharge point P represents the light amount to be irradiated onto the concentrator 64. In other words, a rate of the light inciding in the concentrator relative to the total light discharged from the discharge point P can be expressed by:

$$e = d\Omega/4\pi$$

Here, $d\Omega$ is a solid angle as viewed from the discharge point to the concentrator.

Assuming that the height of the concentrator is H, bending radius is R and the length of the concentrator is L, and the discharge point P is placed at the center of the height and curvature of the concentrator, $d\Omega$ can be expressed as follow:

$$2L(1 - \cos\theta_c)/R$$

Here, $\theta_c = \tan^{-1}(H/2R)$

Figure 15A:
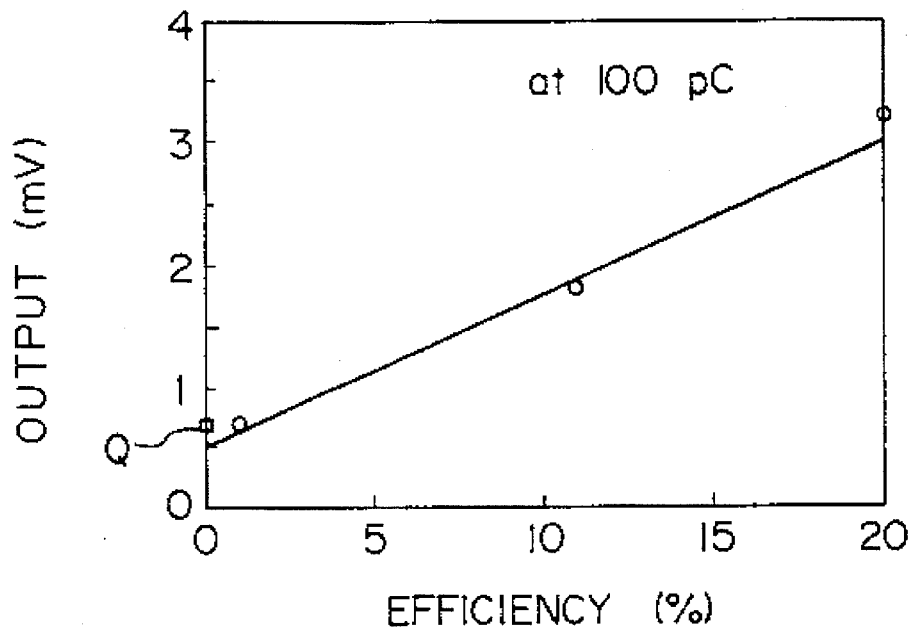
FIGS. 15A and 15B are graphs showing a light focusing effect of the concentrator according to the invention.

In the shown embodiment, concentrators having incident rates e of 1.6, 11 and 20% are prepared. The results of experiments performed with respect to these concentrators are shown in FIGS. 15A and 15B.

From these experiments, it can be appreciated that the output voltage from the fluorescent fiber is increased according to an increase in the focusing rate. Also, it can be appreciated that in comparison with the case where a fluorescent fiber is solely used (Q of FIG. 15A), discharge light detecting performance can be increased by employing the concentrator.

Figure 15B:
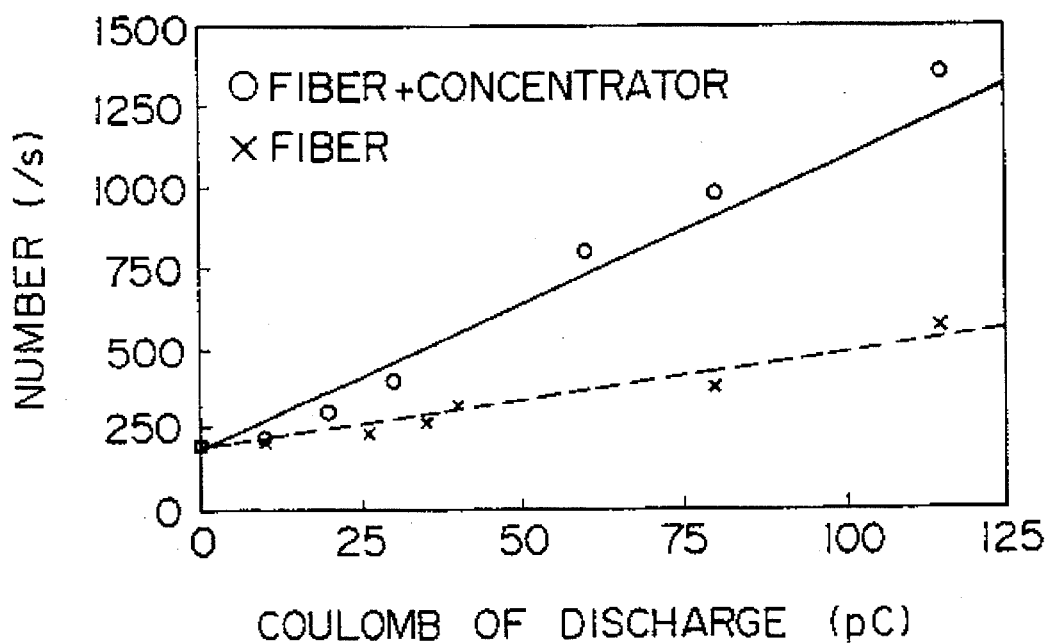

On the other hand, in FIG. 15B, there is illustrated a comparison of the light detecting performance between a fluorescent fiber and a concentrator with a 20% focusing rate, and in the case where only a fluorescent fiber is used, while the discharged charge amount is varied in a range of 10 to 120 pC, in the foregoing experiments. Therefore, FIG. 15B shows relationship between a count for the output pulses of the photo counting measurement equipment counted by a pulse counter and the maximum discharge amount. As can be appreciated from the results, in comparison with the conventional method, in which the fluorescent fiber is solely used, the light detecting device according to the present invention exhibits approximately 2.5 times higher performance.

In the light detecting device according to the present invention, as illustrated in FIG. 6, the concentrators 31 and 32 are arranged at both sides of the fluorescent fiber F. Except for the surfaces 34 opposing the fluorescent fiber F, the concentrators 31 and 32 are formed in a rectangular configuration. When the light is caught at both sides in left and right directions, reflection layers 36, 36 are formed on upper and lower back sides so that the fluorescence generated in the concentrator can be reflected toward the fluorescent fiber F. It is also possible to provide reflection layers 37, 37 at both end surfaces.

As can be appreciated from the foregoing examples, there are areas 33, 33 at both left and right sides, where the concentrators 31 and 32 are not present. Therefore, the light inciding in these areas 33, 33 directly incides in the fluorescent fiber F to excite the fluorescent coloring matter to cause it to fluoresce. The fluorescence thus generated propagates to the end and is detected thereat.

FIG. 7 shows another embodiment of the present invention, in which a pair of concentrators 31 and 32 are arranged vertically to oppose the fluorescent fiber F from the upper and lower sides. The respective concentrators 31 and 32 are formed to have an arch-shaped crosssection. In this case, the concentrators 31 and 32 are arranged to oppose the luminescence position at the center of the concave surface 38. With this arrangement, luminescence can be detected at any position on the concave surface 38 to improve reliability in detection of the light. Also, at the side of the concave surface 38, the area 33 where the concentrators 31 and 32 are not present, is provided so that the light can directly incide into the fluorescent fiber F.

It is preferable to provide the reflection layers 36, 36 on the upper and lower back faces and the reflection layers 37, 37 on both end surfaces. Although it is possible to catch the light generated at the side of the convex surface 39, when the light is detected only at the concave surface 38, it may be preferred to provide a reflection layer on the convex surface 39.

FIG. 8 shows a cylindrical concentrator 30 as another embodiment of the invention. The concentrator 30 has a fluorescent fiber receptacle portion extending in parallel to the longitudinal axis thereof. The fluorescent fiber F is disposed in the fluorescent fiber receptacle portion. The fluorescent fiber receptacle portion has the identical construction to that of FIG. 7. In this case, both circumferential ends 31 and 32 of the cylindrical concentrator 30 serve as the concentrators 31 and 32. In other words, the embodiment of FIG. 7 is formed by cutting the cylindrical concentrator of FIG. 8 at both sides of the fluorescent fiber receptacle portion to obtain the arch-shaped concentrators.

As shown in FIG. 8, when the luminescence position is placed inside of the cylindrical concentrator 30, the fluorescence can be certainly generated at a certain point on the inner periphery 40 of the cylindrical concentrator 30 to propagate in the fluorescent fiber F. Therefore, reliability in light detection can be increased. Also, since the cylindrical concentrator can provide a large light receiving area, the amount of fluorescence to be generated in the cylindrical concentrator can be large to successfully increase the detecting output.

It is possible to detect external luminescence with the cylindrical concentrator. However, when the luminescence only within the cylindrical concentrator is detected, the focusing rate can be increased by providing a reflection layer 41 on the outer periphery. It is further preferred to provide a reflection layer at both end faces 42, 42 of the cylindrical concentrator 30.

In the foregoing embodiment, the fluorescent fiber F and the opposing surfaces 34 have the identical curvature and the surfaces 34 are tightly fitted onto the outer periphery of the fluorescent fiber F. However, it is also possible to arrange the surfaces 34 to oppose the fluorescent fiber F with a clearance.

FIG. 9 shows a further embodiment of the present invention, in which the side end surfaces 34, 34 of the concentrators 31 and 32 opposing the fluorescent fiber F are formed as convex lenses. By forming the surface opposing the fluorescent fiber F into convex lenses, the fluorescence generated in the concentrators 31 and 32 can be converged to the fluorescent fiber F. As a result, the amount of fluorescence generated in the fluorescent fiber F can be increased to amplify the detection output signal. Needless to say, the idea of FIG. 9 is applicable for the surfaces 34 opposing the fluorescent fiber F in the embodiments of FIGS. 5 to 8.

In the foregoing embodiments, the plastic concentrators 31, 32 and 30 are preferably formed of transparent plastic, such as acryl resin, polycarbonate resin, polystyrene resin or co-polymer resins thereof. Among these, acryl resin has a high degree of transparency and can effectively propagate the fluorescence generated in the concentrator to the surface 34 opposing the fluorescent fiber F. On the other hand, although polycarbonate has a lower degree of transparency, it has a high focusing rate and it is difficult for the fluorescence generated in the concentrator to escape to the outside thus providing high efficiency in transmission of the fluorescence.

On the other hand, the coloring matter to be doped in the plastic concentrators 31, 32 and 30 can be organic coloring matter, such as perylene group coloring matter, BBOT, coumarin coloring matter, imidazole coloring matter, a mixed coloring matter thereof, or so forth. BBOT is particularly preferred.

FIG. 10 shows still another embodiment of the present invention, in which the concentrator 43 is formed by bending a plurality of the fluorescent fibers f . . . arranged in a reed screen like arrangement into a ring shaped configuration. The fluorescent fiber F for detecting the luminescence position is arranged between both ends 44 and 45 of the array of the fluorescent fibers f . . . . The effect of the shown embodiment is substantially the same as that achieved by the cylindrical concentrator 30 of FIG. 8. The shown construction is differentiated from the construction of the cylindrical concentrator 30 of FIG. 8, in that the concentrator is formed by employing the fluorescent fibers f . . . as constructional members. It should be appreciated that when the tip end surface of each fluorescent fiber is formed into a convex lens, an increased amount of fluorescence generated in the fluorescent fiber F for detecting the luminescence position can be obtained as in the embodiment of FIG. 9.

FIG. 11 shows a yet further embodiment of the present invention. When a plurality of fluorescent fibers f . . . are formed into the ring shaped configuration as in the embodiment of FIG. 10, production of such a ring shaped configuration can be facilitated by forming a plurality of grooves 47 with a regular interval on one side of a transparent plate 46, disposing each fluorescent fiber f within each groove 47, and bending the transparent plate 46 together with the fluorescent fibers f . . . . In this case, since the transparent bodies 48 are present between respective fluorescent fibers f, the light inciding in the transparent body 48 can be guided into the fluorescent fiber f.

On the other hand, in the present invention, it is possible to employ a fiber of the same material for the concentrators 31, 32 and 30 in FIGS. 5 to 9, namely a plastic fiber containing the fluorescent coloring matter, can be used in place of the fluorescent fibers f . . . in the embodiments of FIGS. 10 and 11.

Figure 21:
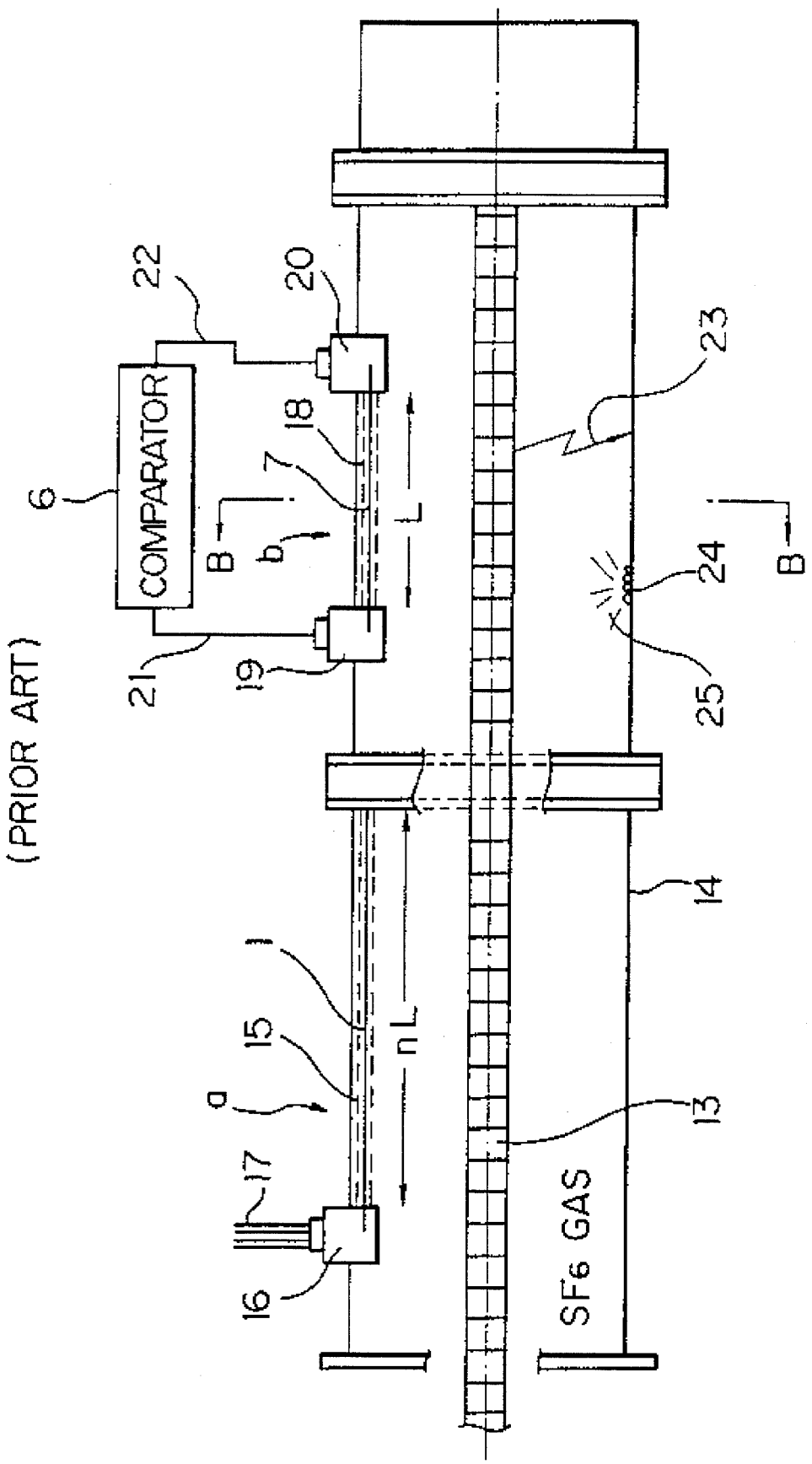
FIG. 21 is a section view in which a fluorescent fiber type luminescence position detecting device of FIGS. 18 and 19, is employed in a gas insulated switchgear.

As set forth above, by employing the concentrators 31, 32, and the cylindrical concentrators 30 and 43 in combination with the fluorescent fiber F for detecting the luminescence position, reliability in detection of the luminescence position can be improved. Therefore, when a light detecting device according to the present invention is applied to the gas insulated switchgear illustrated in FIG. 21, it can reliably detect even weak luminescence or luminesce at the back side of the high voltage switches. It should be noted that the present invention is applicable for applications other than the gas insulated switchgear, in any case where the luminescence in the $SF_6$ gas is to be detected.

As set forth above, according to the present invention, light can be detected not only by detecting the light directly inciding to the side surface of the fluorescent fiber F, but also by generating fluorescence with the light inciding in the concentrator formed of plastic containing fluorescent coloring matter to have a wide light receiving surface, propagating the thus generated fluorescence into the fluorescent fiber F, again generating fluorescence by re-converting the fluorescence from the concentrator in the fluorescent fiber F, and detecting thus generated fluorescence at the end of the fluorescent fiber. By employing the concentrators 31, 32, 30, 43 in combination with the fluorescent fiber F, the light receiving area can be increased to increase the amount of the light received and enable detection of a weak luminescence. Also, as a result of expansion of the light receiving area, restriction due to directionality can be eliminated so that luminescence in a wide area or at a distance can be effectively detected to enhance reliability in light detection.

On the other hand, it has been found that when the light detecting device is used in the above-mentioned application, the following problem will arise. Namely, as a precursor, the gas insulated equipment generates a weak local discharge at the faulty portion. By this local discharge, the $SF_6$ gas filled in the gas insulated equipment is decomposed into $SF_4$ and $F_2$ under high temperature. $SF_4$ thus generated reacts with a residual water in the equipment to generate a highly corrosive HF gas. When this HF gas directly contacts the outer periphery of the fluorescent fiber, corrosion can be caused in the clad layer of the fluorescent fiber.

Figure 16A:
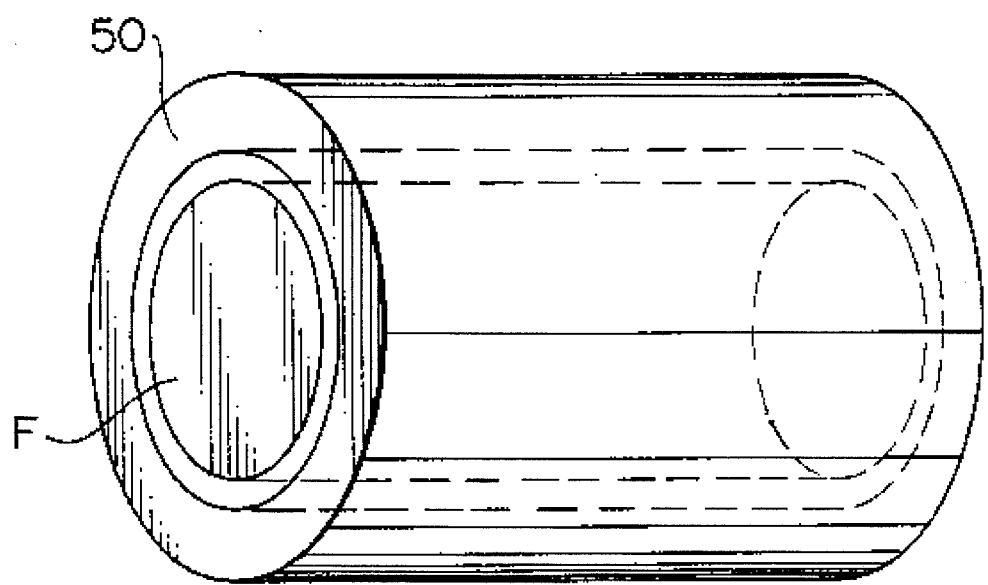
FIGS. 16A and 16B are illustration showing a third embodiment of the light detecting device according to the present invention.

In order to avoid the problem as set forth above, the present invention uses a technical solution discussed as the third embodiment of the invention. Namely, as shown in FIG. 16A, a transparent protection layer 50 is formed on the surface of the fluorescent fiber. The protection layer is preferred to have at least one of a corrosion resistant and thermal resistant material. Further preferably, the protection layer is formed of a resin selected from a fluoride resin and silicon resin.

Figure 16B:
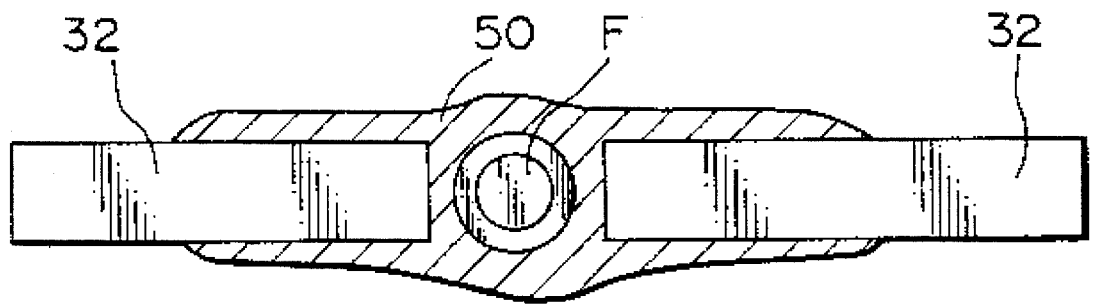

On the other hand, in the present invention, it is possible that, instead of using the foregoing fluorescent fiber, protection against the HF gas can be provided by forming the light detecting device in the form as illustrated in FIGS. 5 to 7 with the normal, unprotected fluorescent fiber, and thereafter coating the contacting portion between the fluorescent fiber F and the concentrators (30 to 32) with the above-mentioned protection layer, as shown in FIG. 16B.

In the present invention, by combining the protection layer 50 having transparency, thermal resistance and corrosion resistance, with the fluorescent fiber F, the HF gas will never contact the outer periphery of the fluorescent fiber F so that it will not be affected during long periods of use.

As set forth above, the present invention protects the fluorescent fiber from corrosion due to decomposed HF gas, by providing a coating with a protection layer having transparency, thermal resistance and corrosion resistance, as shown in FIGS. 16A and 16B.

Figure 17:
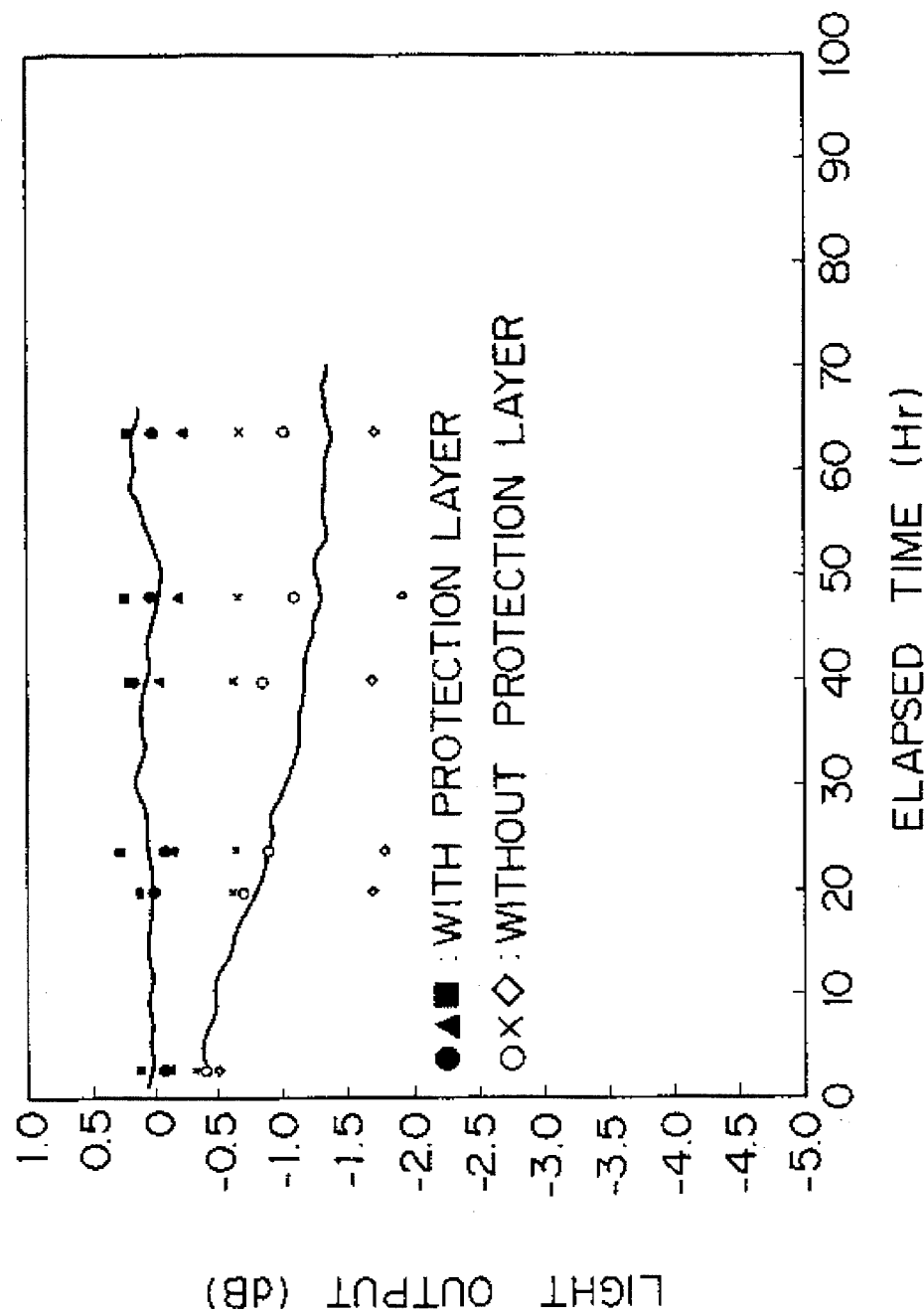
FIG. 17 is graphs illustrating effects of the third embodiment of the light detecting device of the present invention.

As a material for forming the protection layer in the present invention, thermoplastic fluororubber (tradename: Diel Thermoplastic (registered trademark)) which has high transparency, thermal resistance and corrosion resistance, can be used, for example. FIG. 17 shows a result of quantitative evaluation of variation of the performance due to decomposed $SF_6$ gas by generating the decomposed $SF_6$ gas in a testing container, in which is disposed the fluorescent fiber, leaving the fluorescent fiber for a given period and measuring the fluorescent light conversion performance of the fluorescent fiber thereafter. As can be clearly seen from FIG. 17, substantially no variation is observed in the fluorescent fiber having the protection layer, but degradation can be observed in the fluorescent fiber without the protection layer.

As set forth above, according to the present invention, the fluorescent fiber is successfully protected by the protection layer against the decomposed gas which can be generated upon occurrence of failure in the substation facility, such as gas insulated equipment. Therefore, the light detecting device according to the present invention can be used even under severe environmental conditions to contribute to greatly improved performance of the substation facility, such as gas insulated equipment, and thereby contribute to a stable supply of power.

We claim:

1. A tank comprising:

a casing defining a compartment in which sulfur hexafluoride gas is included; and a light detecting device for detecting luminescence generated in the compartment of said casing, said light detecting device comprising:

a fluorescent fiber containing a fluorescent coloring matter and having an outer periphery;

a flat or curved concentrator containing a fluorescent coloring matter and having a side surface portion, said fluorescent fiber being arranged along said side surface portion; and light receiving means connected to at least one end of said fluorescent fiber.

2. A tank as set forth in claim 1, wherein the fluorescent coloring matter contained in said fluorescent fiber and fluorescent coloring matter contained in said concentrator have mutually different light absorption wavelengths and light generating wavelengths.

3. A tank as set forth in claim 2, wherein the fluorescent coloring matter contained in said fluorescent fiber has a longer light generating wavelength than the fluorescent coloring matter contained in said concentrator.

4. A tank as set forth in claim 1, wherein the fluorescent coloring matter contained in said fluorescent fiber has a light absorption wavelength range which overlaps a light generating wavelength range of the fluorescent coloring matter contained in said concentrator.

5. A tank as set forth in claim 1, wherein said concentrator is divided into two separate portions, and said fluorescent fiber is arranged between said two separate portions in such a manner that the outer periphery of the fluorescent fiber is fitted between side surface portions of said two separate portions.

6. A tank as set forth in claim 5, wherein said two separate portions each extend along a portion of a wall of said casing.

7. A tank as set forth in claim 6, wherein a reflection layer is provided on a surface of said concentrator facing the wall of said casing.

8. A tank as set forth in claim 1, wherein said concentrator has a tubular form extending along a wall of said casing, a portion of all the tubular form corresponding in shape to the outer periphery of the fluorescent fiber being removed to define two surface portions, and said fluorescent fiber is arranged between the two surface portions of said concentrator defined by the removed portion.

9. A tank as set forth in claim 8, wherein a reflection layer is provided on a surface of said concentrator facing the wall of said casing.

10. A tank as set forth in claim 1, wherein said concentrator has a form extending along a wall of said casing.

11. A tank as set forth in claim 10, wherein a reflection layer is provided on a surface of said concentrator facing the wall of said casing.

12. A tank as set forth in claim 1, wherein said fluorescent fiber has a portion of the outer periphery not surrounded by said concentrator.

13. A tank as set forth in claim 1, wherein the side surface portion of said concentrator along which said fluorescent fiber is arranged is formed into a convex lens.

14. A tank as set forth in claim 1, wherein said concentrator is formed of a transparent plastic selected from the group consisting of acryl resin, polycarbonate resin, polystyrene resin and co-polymers thereof.

15. A tank as set forth in claim 14, wherein the fluorescent coloring matter is doped in the transparent plastic of said concentrator and the fluorescent coloring matter is selected from the group consisting of organic perylene group coloring matter, BBOT, coumarin coloring material, imidazole coloring matter, b-PBD coloring material and a mixed coloring matter thereof.

16. A tank as set forth in claim 1, wherein said concentrator comprises a plurality of fluorescent fibers circularly arranged in a mutually parallel relationship with ends of the plurality of fluorescent fibers serving as side surface portions along which said fluorescent fiber is arranged.

17. A tank as set forth in claim 16, wherein said concentrator further comprises a transparent support body on which the plurality of fluorescent fibers is arranged.

18. A tank as set forth in claim 1, wherein said concentrator contains a plurality of fluorescent coloring matters, each having a different light generating wavelength range.

19. A tank as set forth in claim 1, wherein a transparent protection layer is formed on the surface of said fluorescent fiber.

20. A tank as set forth in claim 19, wherein said protection layer has at least one of corrosion resistance and thermal resistance.

21. A tank as set forth in claim 20, wherein said protection layer is a fluorine group resin.

22. A tank as set forth in claim 1, wherein a reflection layer is provided on a side surface of said concentrator other than the side surface portion along which said fluorescent fiber is arranged.

* * * * *

UNITED STATES PATENT AND TRADEMARK OFFICE
CERTIFICATE OF CORRECTION

PATENT NO. : 5,585,915
DATED : December 17, 1996
INVENTOR(S) : Kiyoshi KUROSAWA et al.

It is certified that error appears in the above-indentified patent and that said Letters Patent is hereby corrected as shown below:

<u>Title Page</u>, [56] OTHER PUBLICATIONS
after line 14 insert --Patent Abstracts of Japan, Vol. 10, No. 310 (C-379) October 22, 1986 and JP-61 118566 (Dainippon Tokyo) June 5, 1986--.

Figure 18:
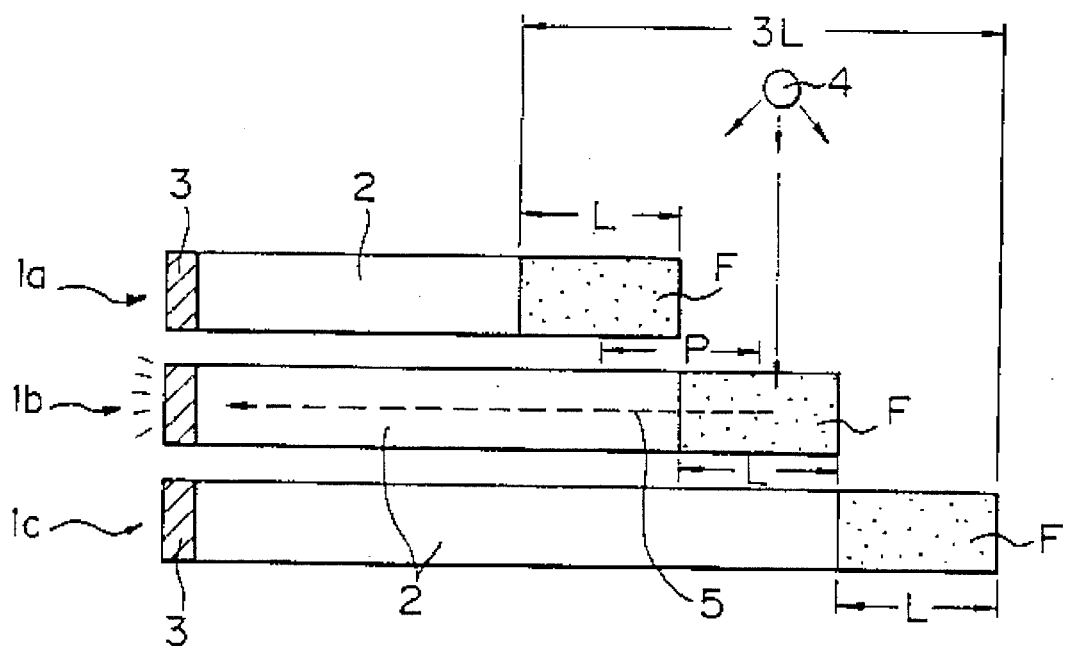
FIG. 18 is a section view of a prior art luminescence position detecting device employing a plurality of fluorescent fibers.
Figure 19:
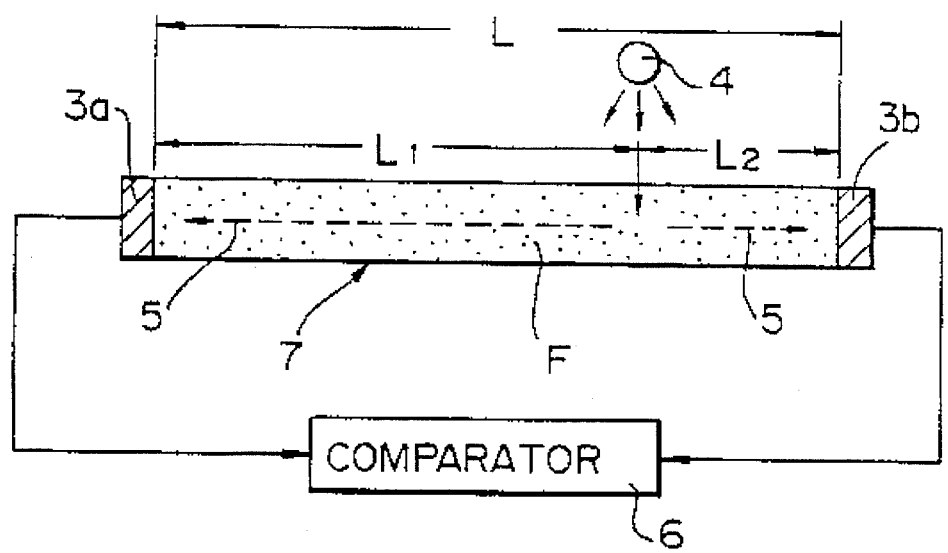
FIG. 19 is a section view showing a prior art luminescence position detecting device employing a single fluorescent fiber.
Figure 20:
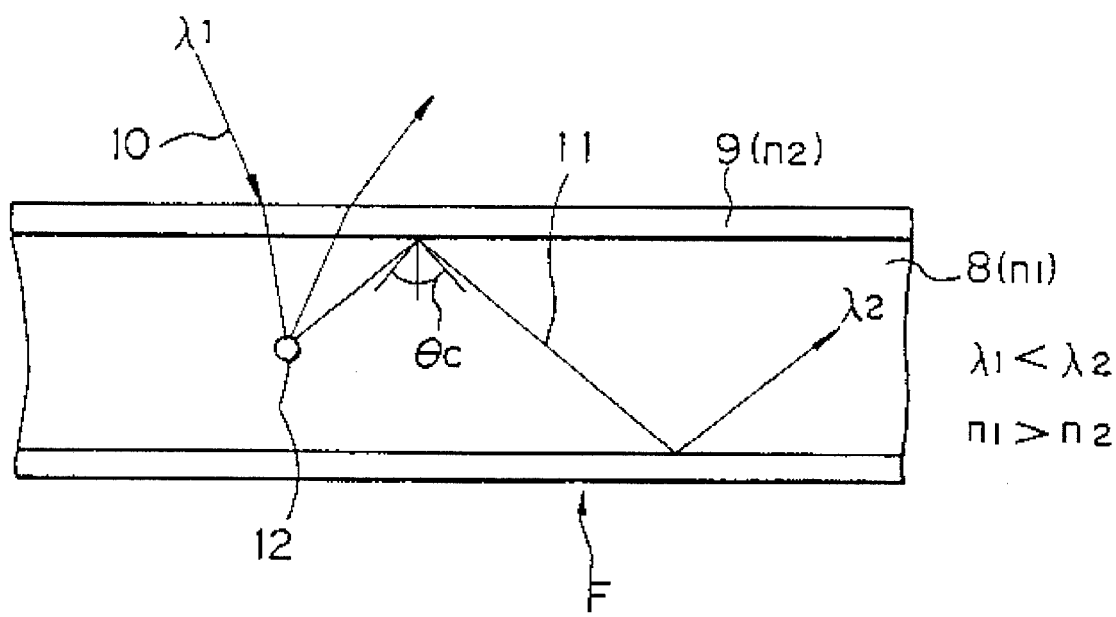
FIG. 20 is a section view illustrating a fluorescent converting action in a fluorescent fiber formed by doping BBOT in polycarbonate.
Figure 22:
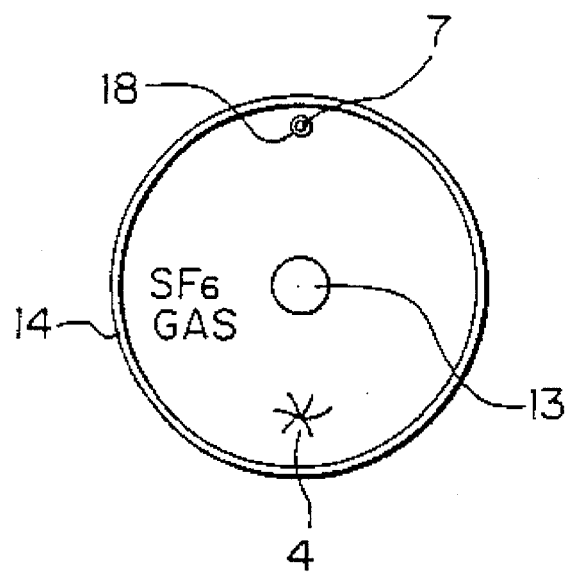
FIG. 22 is a section view taken along line B—B of FIG. 21.

<u>Col. 1</u>, line 43, change "Fig. 8" to --Fig. 18--.
<u>Col. 2</u>, line 67, change "$\lambda_2<\lambda_2$" to --$\lambda_1<\lambda_2$--.
<u>Col. 5</u>, line 51, after "is" insert --a-- and change "graphs" to --graph--.
<u>Col. 7</u>, line 2, change "embodiment" to --aspect--.
<u>Col. 8</u>, line 18, change "., " to --,--; and
line 48, change "embodiment" to --embodiments--.
<u>Col. 9</u>, line 55, after "corresponding" insert --to--.
<u>Col. 10</u>, line 32, change "the" to --a--.

Signed and Sealed this

Fifth Day of August, 1997

*Attest:*

*Attesting Officer*

BRUCE LEHMAN
*Commissioner of Patents and Trademarks*

UNITED STATES PATENT AND TRADEMARK OFFICE
CERTIFICATE OF CORRECTION

PATENT NO. : 5,585,915

DATED : December 17, 1996

INVENTOR(S) : Kiyoshi KUROSAWA et al.

It is certified that error appears in the above-indentified patent and that said Letters Patent is hereby corrected as shown below:

Title Page, [73] Assignees:

change "Fuju" to --Fuji--.

Signed and Sealed this

Tenth Day of February, 1998

Attest:

BRUCE LEHMAN

Attesting Officer

Commissioner of Patents and Trademarks